(12) United States Patent  (10) Patent No.: US 8,103,756 B2
Yalakanti et al.  (45) Date of Patent: Jan. 24, 2012

(54) NETWORK ACCESS DEVICE CAPABILITY ALERT MECHANISM

(75) Inventors: Ramachandra Yalakanti, Roseville, CA (US); Chuck A. Black, Rocklin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1454 days.

(21) Appl. No.: 11/555,189

(22) Filed: Oct. 31, 2006

(65) Prior Publication Data

US 2008/0104196 A1  May 1, 2008

(51) Int. Cl.
*G06F 15/173* (2006.01)

(52) U.S. Cl. ........ 709/223; 709/206; 709/224; 709/228; 709/232

(58) Field of Classification Search ................. 709/206, 709/223, 224, 228, 232
See application file for complete search history.

(56) References Cited

U.S. PATENT DOCUMENTS

| 7,779,069 B2* | 8/2010 | Frid-Nielsen et al. ........ 709/203 |
| 2002/0087674 A1* | 7/2002 | Guilford et al. ............. 709/223 |
| 2004/0114601 A1* | 6/2004 | Watanabe et al. .......... 370/395.2 |
| 2004/0158618 A1* | 8/2004 | Shaw ........................... 709/217 |
| 2005/0007967 A1* | 1/2005 | Keskar et al. ................ 370/310 |
| 2005/0022006 A1* | 1/2005 | Bass et al. .................... 713/201 |

* cited by examiner

*Primary Examiner* — Liangche A Wang

(57) ABSTRACT

A system on a computer network device for managing a network access device capability arranged to alert a computer network administrator if a network access device lacks the capability to implement a user access profile.

20 Claims, 3 Drawing Sheets

NETWORK ACCESS DEVICE CAPABILITY ALERT MECHANISM

BACKGROUND

Network administrators have difficulty managing network device capabilities with management systems that do not alert the network administrator when network devices lack a capability to implement the security or performance policies of a computer network. Network administrators consume a great deal of time manually checking network devices to determine if they have the capabilities to implement security and performance policies of computer networks, and if network administrators are unaware of network devices that lack the capabilities to implement security and performance policies of computer networks, the security and performance policies of the computer networks may not be implemented.

Further, when security and performance policies of the computer network are set for each individual user login the problem of insuring that the security and performance policies of the computer network are being implemented by network devices becomes more difficult.

DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION

Figure 1:
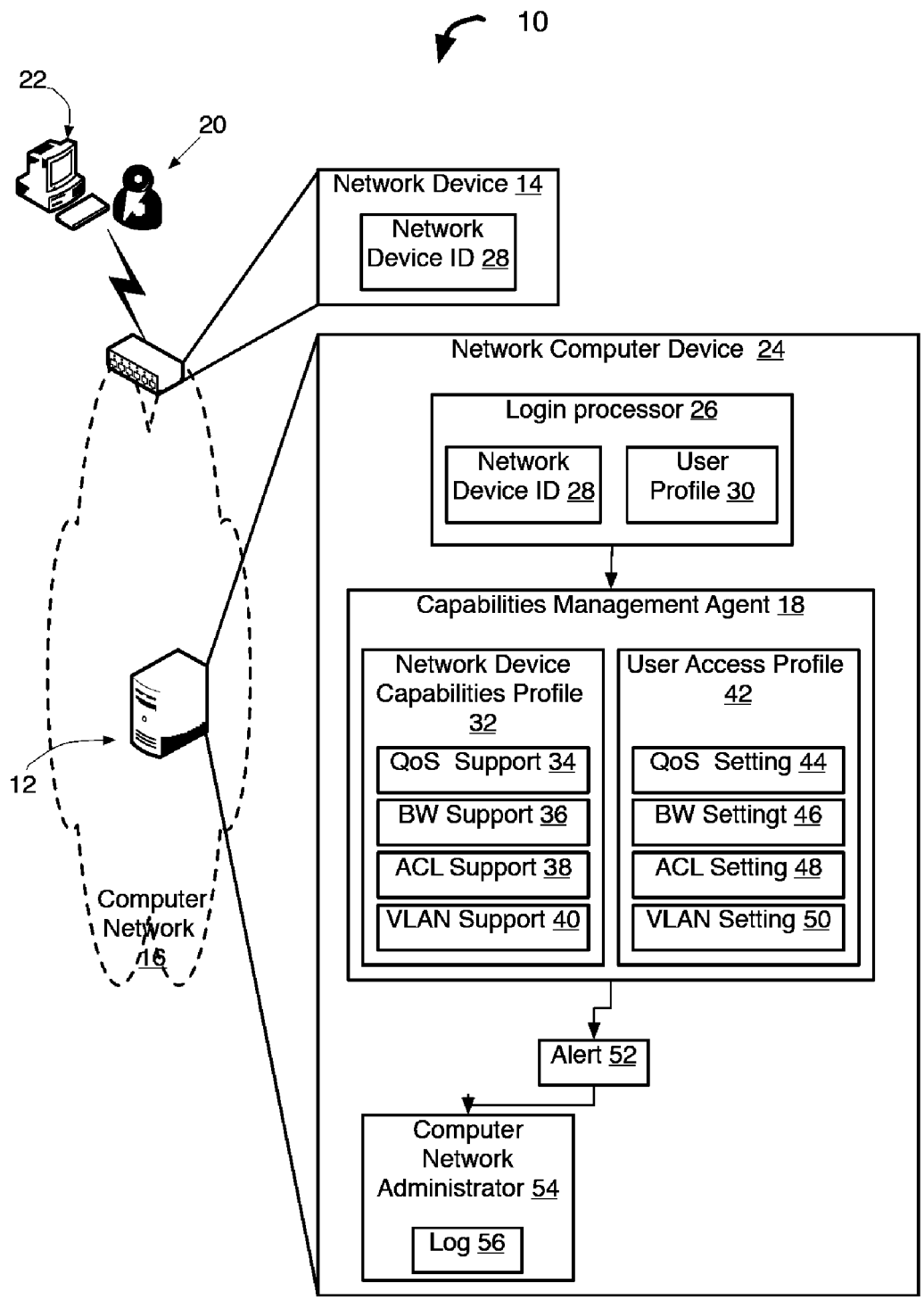
FIG. 1 is a schematic diagram of a system useable in conjunction with an embodiment for managing a network device capability.

FIG. 1 depicts a high-level schematic diagram of a network system 10 in conjunction with which an embodiment may be used to advantage. Network system 10 comprises an access control system 12 communicatively coupled with a network access device 14 via a network 16. In some embodiments, network 16 comprises wired and/or wireless connections between two or more processing systems, e.g., access control system 12, network access device 14, etc.

A user device 22, responsive to manipulation by a user 20, attempts to communicatively connect with network access device 14. In some embodiments, user device 22 may be a personal computer, such as a portable computer or a desktop computer or workstation, or a personal digital assistant, or a tablet computer, or a server. Network access device 14 communicates user information, e.g., identifying information about the user, and access device information, e.g., identifying information about the network access device, to access control system 12 in response to the user device 22 access attempt. Based on user information and/or access device information received from network access device 14, access control system 12 identifies a capability profile of the network access device and a user access profile for user device 22. Access control system 12 compares the network device capability profile and the user access profile and generates an alert based on a determination of a mismatch between the network access device capability profile and the user access profile.

Access control system 12 comprises a capability management agent 18, a login processor 26, and an administrator interface 54. Access control system 12 executes capability management agent 18 in response to a user 20, via user device 22 communicating with network access device 14, requesting access to network 16.

In some embodiments, user device 22 may be a personal computer, such as a portable computer or a desktop computer or workstation, or a personal digital assistant, or a tablet computer, or a server, or another computing device useable by a user 20 to connect to network 16. Further, in some embodiments network access device 14 ("edge network device") comprises a device providing access to a network such as a switch, access point, or other network access device to which a user device (user device 22) connects to access network 16. Access control system 12 executes a login processor 26 for authenticating user 20. In the following discussion, user 20 has already been authenticated by login processor 26. Login processor 26 receives a network device ID 28 from network access device 14 in conjunction with receipt of the login request from user device 22. In some embodiments, network access device 14 transmits network device ID 28 separately from the login request from user device 22. In some embodiments, login processor 26 transmits the network device ID 28 to capabilities management agent 18. Login processor 26 further receives a user profile 30 associated with user 20 and transfers the profile to capability management agent 18. In some embodiments, login processor 26 determines the user profile 30 based on a user 20. In some embodiments, capabilities management agent 18 determines user profile 30 based on a user 20. In some embodiments, capability management agent 18 obtains user profile 30 from login processor 26. In other embodiments, access control system 12 stores user profile 30 in a memory of the access control system 12 accessible to capability management agent 18.

Capability management agent 18 determines a network device capability profile 32 associated with network access device 14. In some embodiments, login processor 26 determines the network device capability profile 32, and in still other embodiments, other modules associated with the network 16 determine the network device capability profile 32. Network device capability profile 32 specifies capabilities of network access device 14. In FIG. 1, network device capability profile 32 comprises four capabilities: quality of service (QoS) support 34, bandwidth (BW) support 36, access control list (ACL) support 38, and virtual local area network (VLAN) support 40. The four capabilities comprising the network device capability profile 32 specify capabilities which network access device 14 supports with the hardware and software of the network device. For example, BW support 36 may be a binary value, e.g., BW=true, specifying that the network access device 14 can be configured to limit the user device 22 of a user 20 to a predetermined BW, e.g. 100 kilobits/second (kb/s). In some embodiments, network device capability profile 32 may comprise greater or lesser number of capabilities.

The capability management agent 18 determines the user access profile 42, but in other embodiments the login processor 26 determines the user access profile 42, and in still other embodiments other modules associated with the network 16 determine the user access profile 42. The user access profile 42 comprises settings to configure a network access device 14 to enforce security and performance policies of the network 16. In the FIG. 1 embodiment, four settings are listed in the user access profile 42: quality of service (QoS) setting 44, bandwidth (BW) setting 46, access control list (ACL) setting 48, and virtual LAN (VLAN) setting 50. An example setting may be BW=limit to 100 thousand bits/second, which would mean that the user 20 should only be given a bandwidth from the network access device 14 to the user device 22 of the user 20 of 100 kb/s.

The capabilities management agent 18 then determines whether the network access device 14 associated with network device capabilities profile 32 can implement each of the settings in the user access profile 42. For example, continuing the example above for a BW=100 kb/s in the user access profile 42, the capabilities management agent 18 determines if the BW support 36 of the network device capabilities profile 32 supports limiting the BW to 100 kb/s. The capabilities management agent 18 then sends an alert 52 to a computer network administrator 54 if the network access device 14 cannot support each of the settings in the user access profile 42. The alert 52 along with associated information such as identifiers for the network access device 14, the user 20, the user access profile 42, and the capability lacking in the network access device 14 may be logged in a log 56. The computer network administrator 54 may take appropriate remedial action by upgrading or replacing the network access device 14 so that the network access device 14 will be able to support each of the settings in the user access profile 42, and/or the computer network administrator 54 can alter the settings in the user access profile 42 so that the network access device 14 is able to support each of the settings contained in the user access profile 42. The computer network administrator 54 may take other actions based on the alert 52, e.g. ignore the alert 52. In some embodiments, capabilities management agent 18 stores the alert 52 to a log 56 and in other embodiments, the agent 18 displays the alert on a display connected with access control system 12.

The capabilities management agent 18 will then transmit the user access profile 42 to the network access device 14. The network access device 14 implements user access profile 42 for enforcing security and performance policies of the network 16, e.g. implementing (BW) setting 46, where BW=limit to 100 kb/s, may be implemented by the network access device 14 by setting a bandwidth limit on the communication between the network access device 14 and the user device 22. In other embodiments, the capabilities management agent 18 configures the network access device 14 according to the user access profile 42. In other embodiments, another module associated with the network 16 configures the network access device 14 according to the user access profile 42.

Thus, the present apparatus, methods, computer-readable media and processors provide an apparatus for managing a capability of a network access device 14 by generating an alert 52, e.g., sending an alert 52 to a computer network administrator 54, logging the alert, etc., when a network access device 14 lacks a capability to implement a setting in a user access profile 42.

FIG. 1 depicts the network access device 14 which may include different types of network access devices 14 (also referred to as edge, infrastructure, or access point devices) such as a switch, wireless access point, or a router. The network access device 14 may be carried out in software, firmware, or hardware and may reside on a computing device attached to the network 16, including special purpose hardware, mini computer, mainframe computer, handheld computer, etc. In some embodiments, the network access device 14 is a device that the user device 22 of the user 20 is using as an intermediary to access resources of the network 16.

Network 16 may comprise communications networks arranged to permit two or more computing devices to communicate, e.g., wired and wireless components. For example, network 16 may include at least one, or a combination of: public heterogeneous communication networks, such as the Internet; private communication networks; Ethernet networks; and wired and/or wireless networks.

The access control system 12 and the user device 22 of the user 20 may be hardware, software, firmware, server, personal computer, mini computer, mainframe computer, or a computing device either special purpose or general computing device in communication with the network 16. In one embodiment, the access control system 12 is a server and the user device 22 is a personal computer.

The user 20 may be a person accessing the network 16 or the user 20 may comprise hardware, software, firmware, that is attempting to access the network 16 in response to input from a user. An authenticated user is a user 20 that has been authorized for network access by the login processor 26.

The login processor 26 may comprise hardware, software, firmware, server, personal computer, mini computer, mainframe computer, or a computing device either special purpose or general computing device. In one embodiment, the login processor 26 authenticates the user 20 on the network 16 and then determines a user profile 30 for the user 20 which may comprise an identifier for the user device 22, an identifier for the user 20, the time of day, and the location from which the user 20 is accessing the network 16. The user profile 30 along with a network device ID 28 are then sent to the capabilities management agent 18. In other embodiments, the login processor 26 will use the user profile 30 to determine the user access profile 42, and use the network device ID 58 to determine the network device capabilities profile 32 and then send the user access profile 42 and the network device capabilities profile 32 to the capabilities management agent 18.

In some embodiments, the login processor 26 will ignore an inability to call the capabilities management agent 18. In some other embodiments, if the capabilities management agent 18 cannot be invoked the user 20 will not be permitted access to the network 16. In some other embodiments, the login processor 26 will not permit a user 20 access to the network 16 if an alert 52 is generated by the capabilities management agent 18. In some other embodiments, the login processor 26 will ignore an alert 52 generated by the capabilities management agent 18. The login processor 26 may reside on the same access control system 12 as the capabilities management agent 18 or on a different access control system 12. The computer network administrator 54 may reside on the same access control system 12 as the login processor 26 and the capabilities management agent 18 or the computer network administrator 54 may reside on a different access control system 12 or any computer device in communications with the network 16.

Network device ID 58 is an identifier for identifying a network access device 14 on the network 16. In some embodiments, the network device ID 58 may be the IP address of the network device, or the MAC address of the network device.

The user profile 30 is data associated with a user 20 that is used to determine a user access profile 42 which specifies security and performance policies of the network 16. The user profile 30 may comprise a user identifier, the current time of day, an identifier for the user device 22 from which the user 20 is accessing the network 16, and the physical location from where the user 20 is accessing the network 16.

The capabilities management agent 18 may comprise at least one of a type of hardware, software, firmware, server, personal computer, mini computer, mainframe computer, or a computing device either special purpose or general computing device. In some embodiments, the capabilities management agent 18 is arranged to take a network device ID 28 and determine the network device capabilities profile 32. In some embodiments, the capabilities management agent 18 may use a network device capabilities module 58 (depicted in FIG. 2) to determine the network device capabilities profile 32. In some other embodiments, the capabilities management agent 18 is arranged to receive the network device capabilities profile 32.

In some other embodiments, the capabilities management agent 18 is arranged to obtain a user profile 30 and determine a user access profile 42. In some other embodiments, the capabilities management agent 18 is arranged to receive the user access profile 42. In some other embodiments, the capabilities management agent 18 uses another module to determine the user access profile 42.

The capabilities management agent 18 is arranged to determine if a network access device 14 has the capabilities to implement the security and performance policies specified in a user access profile 42 for a user 20 based on a network device capabilities profile 32 of the network access device 14. In some embodiments, the capabilities management agent 18 accesses each setting in the user access profile 42 and determines if the network access device 14 can implement the setting based on the network device capabilities profile 32.

The capabilities management agent 18 is further arranged to alert 52 a computer network administrator 54 if the network access device 14 lacks the capability to implement the user access profile 42. In some embodiments, the capabilities management agent 18 is arranged to write into log 56 information associated with the alert 52 that a network access device 14 lacks the capability to implement the user access profile 42.

In some other embodiments, the capabilities management agent 18 is further arranged to deny access to the user 20 to the network 16 if the network access device 14 cannot implement a user access profile 42. In other embodiments, the user 20 may be denied access to the network 16 by another module such as the login processor 26 if the network access device 14 cannot implement the user access profile 42. In another embodiment, the capabilities management agent 18 is further arranged to configure the network access device 14 to implement the user access profile 42.

The computer network administrator 54 may comprise at least one of hardware, software, firmware, server, personal computer, mini computer, mainframe computer, or a computing device either special purpose or general computing device. The computer network administrator 54 may be locally attached to the network 16 or may be in communication with the network 16.

The alert 52 is a message sent to the computer network administrator 54. The alert 52 may comprise data associated with the user 20, the network access device 14, the network 16, and the user access profile 42.

The log 56 is a storage location accessible from the network 16 by the capabilities management agent 18. In one embodiment, the log 56 is stored on the access control system 12 and arranged to store alerts 52 on the control system 12. The log 56 may be located on any computing device in communication with the network 16.

Figure 2:
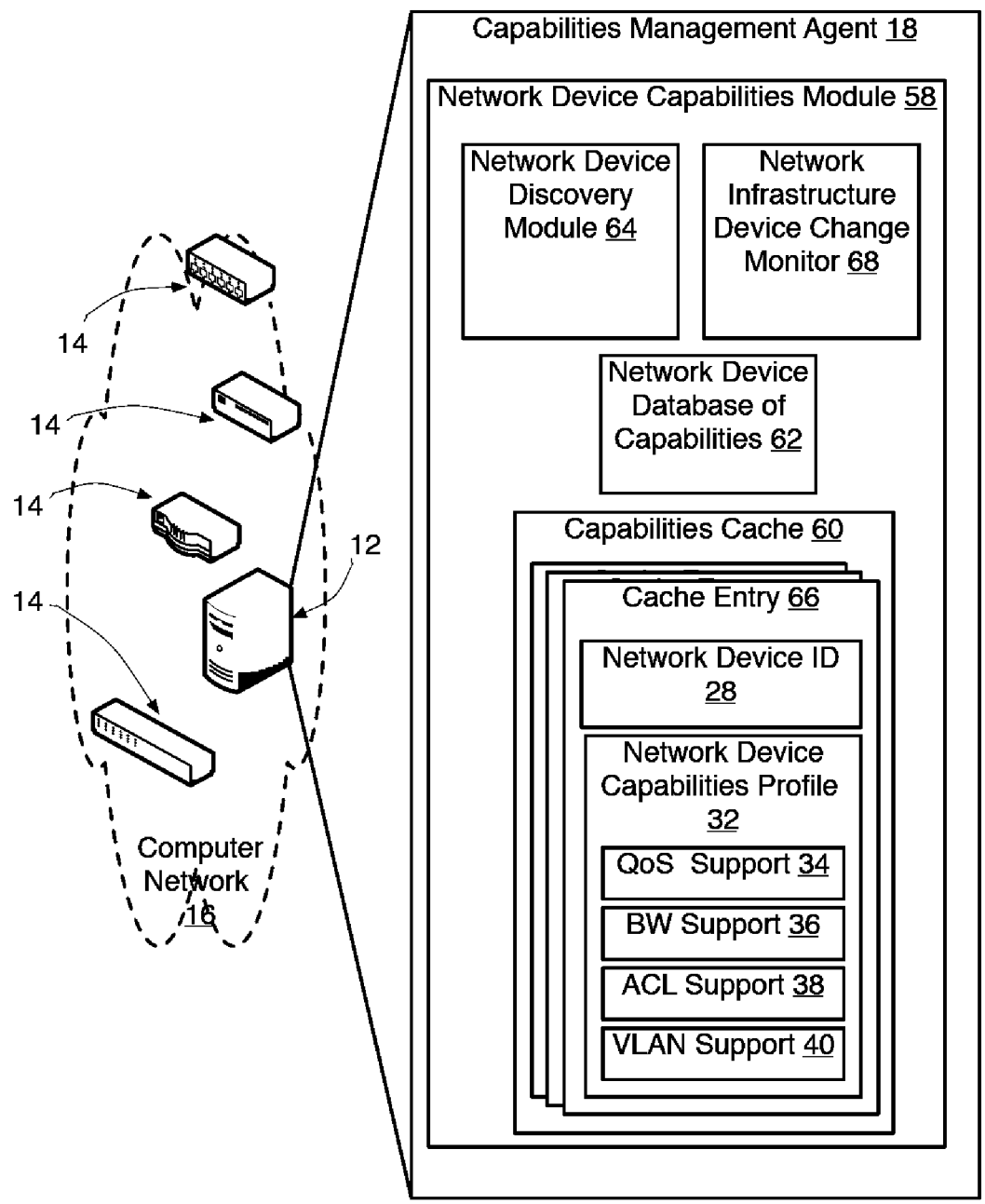
FIG. 2 is a schematic diagram of another embodiment of a system for managing a network device capability.

FIG. 2 depicts another embodiment of a capabilities management agent 18 further arranged to build and maintain a capabilities cache 60 in order to be able to determine the network device capabilities profile 32 of network access device 14 given a network device ID 28.

FIG. 2 further depicts the network device capabilities module 58, which builds the network device database of capabilities 62 by using information available regarding product families and firmware revisions of network devices 14, and by using information from configuration files for the network devices 14. The network device database of capabilities 62 returns a set of capabilities for a given network product and firmware version.

The network device discovery module 64 discovers network devices 14 on the network 16. For each discovered network access device 14, the network device discovery module 64 will determine the network product and firmware version of the network access device 14, and then the network device discovery module 64 will determine the capabilities of the network access device 14 by using the network device database of capabilities 62. The network device discovery module 64 will then make a cache entry 66 for the network access device 14. In an embodiment, the cache entry 66 will be the network device ID of the network access device 14 and the network device capabilities profile 32 of the network access device 14. In some embodiments, the network device discovery module 64 discovers network devices 14 using a method based on the IEEE 802.1AB LLDP standard.

A network device change monitor 68 monitors the network 16 for new network devices 14 and is further arranged to monitor the network devices 14 in the capabilities cache 60 for changes that would affect the capabilities of the network devices 14, e.g. the network access device 14 might receive new firmware, or a software upgrade or a software reconfiguration. The device change monitor 68 is further arranged to update the cache entry 66 of the network devices 14 that have a change that affects the capabilities of the network access device 14. In some embodiments, the network device change monitor 68 uses the IEEE 802.1AB LLDP standard to discover new network devices 14.

Figure 3:
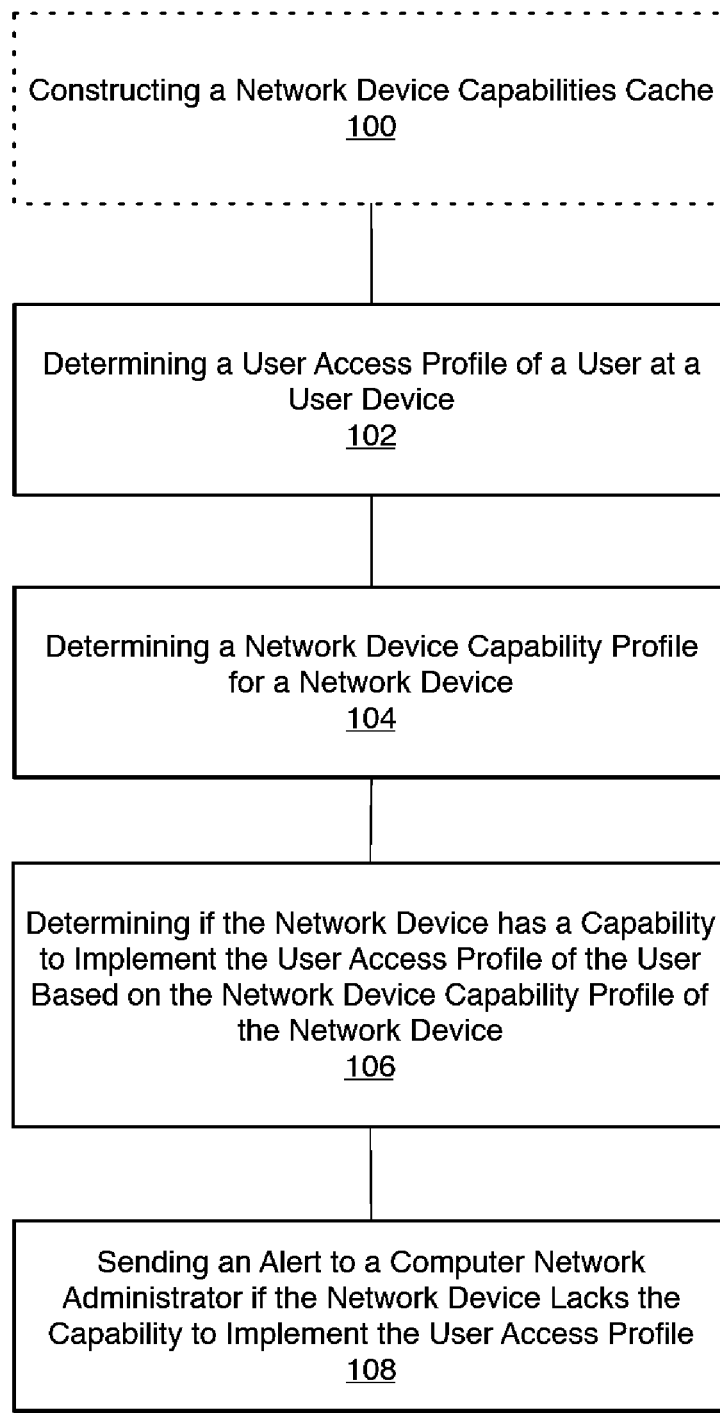
FIG. 3 is a flowchart of a method according to an embodiment for managing a network device capability.

FIG. 3 depicts, an embodiment of a method for managing network device capabilities comprising (optionally) constructing a network device capabilities cache 60 (Block 100). In an embodiment, the network device capabilities module 58 creates the capabilities cache 60. In an embodiment, the network device capabilities module 58 is executed on the computer network device 12 each time the computer network device 12 is restarted. The flow proceeds to determining a user access profile 42 for a user 20 (Block 102). In an embodiment, the capabilities management agent 18 may determine the user access profile 42. In another embodiment, the login processor 26 may determine the user access profile 42 before sending the user access profile 42 to the capabilities management agent 18. The flow proceeds to determining a network device capabilities profile 32 for a network access device 14 (Block 104). In an embodiment, the capabilities management agent 18 may determine the network device capabilities profile 32 for a network access device 14. In an embodiment, the capabilities management agent 18 invokes the network device capabilities module 58 sending the network device ID 28, for determining the network device capabilities profile 32 for a network access device 14. The flow proceeds to sending an alert 52 to a computer network administrator 54 if the network access device 14 lacks a capability to implement the user access profile 42 (Block 106).

What is claimed is:

1. An apparatus for managing a network access device capability, comprising:
   a memory storing code for a capability management agent, wherein the capability management agent is arranged to determine if a network access device has a capability to implement a user access profile of a user based on a network access device capability profile of the network access device, and arranged to alert a computer network administrator if the network access device lacks the capability to implement the user access profile.

2. The apparatus of claim 1, wherein the network access device is an edge network device through which the user device is attempting to login to the computer network.

3. The apparatus of claim 2, wherein the user is an authenticated user.

4. The apparatus of claim 1, wherein the user access profile comprises at least one access setting for the user based on the identity of the user, the group membership of the user, the location from which the user is accessing the computer network, the time at which the user is accessing the computer network, and the system from which the user is accessing the computer network.

5. The apparatus of claim 1, wherein the capability management agent is further arranged to determine whether the network access device can implement a user access profile by determining if each access right listed in the user access profile is supported by the network access device capabilities profile of the network access device.

6. The apparatus of claim 1, wherein the capability in the network access device capability profile comprises at least one of bandwidth, quality of service, access control list, and virtual LAN.

7. The apparatus of claim 1, further comprising:
a set of security and policy rules for implementing security and performance policies for the computer network; and,
the capabilities management agent is further arranged to determine the user access profile using the set of security and policy rules and a user profile, wherein the user profile comprises at least one of an identity of the user, a group membership of the user, a location from which the user device is accessing the computer network, a time at which the user device is accessing the computer network, and a type of user device.

8. The apparatus of claim 7, wherein the rules are based on the current time the user device is connected to the computer network, the type of user device from which the user is accessing the computer network, the location from which the user is accessing the network, the identity of the user, and the groups to which the user belongs.

9. The apparatus of claim 1, wherein the capability management agent is further arranged to determine a network access device capability profile given a network access device identifier.

10. The apparatus of claim 9, wherein the network access device identifier is an IP address.

11. The apparatus of claim 9, wherein the capabilities management agent is further arranged to deny the user access to the computer network if the capability management agent determines that the network access device cannot implement the user access profile.

12. The apparatus of claim 1, wherein the alert to a computer network administrator if the network access device lacks the capability to implement the user access profile is logged in a log and comprises information identifying the network access device, the user device, the user, and the capability lacking in the network access device.

13. The apparatus of claim 1, wherein the capability management agent is further arranged to request the network access device to implement the user access profile.

14. The apparatus of claim 1, further comprising:
a capability cache disposed on a computer network device comprising a network access device capability profile corresponding to a network access device identifier;
a network access device capability module disposed on a computer network device operable to return a network access device capability profile given a network access device identifier using the capability cache;
a network access device database of capabilities containing capability information for different types of network access devices;
a network access device discovery module arranged to discover network access devices on the computer network and build the capability cache using information from the discovered network access devices and from the network access device database of capabilities;
a network access device change monitor arranged to monitor the network access devices comprising the capability cache to detect changes in the network access devices and arranged to monitor the computer network for new network access devices and further arranged to update the capability cache based on a detected change.

15. A method of alerting a system administrator of network access device capability limitations, comprising:
determining a user access profile of a user using a user device;
determining a network access device capability profile for a network access device;
determining if the network access device has a capability to implement the user access profile of the user based on the network access device capability profile of the network access device; and
alerting a computer network administrator if the network access device lacks the capability to implement the user access profile.

16. The method of claim 15, wherein the user is requesting access to the computer network through the network access device.

17. The method of claim 16, wherein the user has already been authenticated for access to the computer network.

18. The method of claim 15, wherein the user access profile implements at least one security and performance policy for the computer network.

19. The method of claim 15, wherein a capability cache for the network access device is constructed.

20. A memory or a non-transitory computer-readable medium storing instructions which, when executed by a processor, cause the processor to determine a user access profile of a user at a user device; determine a network device capability profile for a network access device; determine if the network access device has a capability to implement the user access profile of the user based on the network access device capability profile of the network access device; and alert a computer network administrator if the network access device lacks the capability to implement the user access profile.

* * * * *